US012665151B2

(12) United States Patent
Hofsaess

(10) Patent No.: US 12,665,151 B2
(45) Date of Patent: Jun. 23, 2026

(54) TEMPERATURE-DEPENDENT SWITCH

(71) Applicant: Marcel P. Hofsaess, Steintahleben (DE)

(72) Inventor: Marcel P. Hofsaess, Steintahleben (DE)

( * ) Notice: Subject to any disclaimer, the term of this patent is extended or adjusted under 35 U.S.C. 154(b) by 240 days.

(21) Appl. No.: 18/440,465

(22) Filed: Feb. 13, 2024

(65) Prior Publication Data

US 2024/0290561 A1 Aug. 29, 2024

(30) Foreign Application Priority Data

Feb. 28, 2023 (DE) ..................... 10 2023 104 830.9

(51) Int. Cl.
*H01H 37/54* (2006.01)

(52) U.S. Cl.
CPC . *H01H 37/5427* (2013.01); *H01H 2037/5463* (2013.01)

(58) Field of Classification Search
CPC ................... H01H 37/5427; H01H 2037/5463
USPC .......................................................... 337/112
See application file for complete search history.

(56) References Cited

U.S. PATENT DOCUMENTS

| | | | | |
|---|---|---|---|---|
| 2,622,169 A * | 12/1952 | Cook | H01H 77/04 337/91 |
| 2,753,421 A * | 7/1956 | Mertler | H01H 37/54 337/380 |
| 3,496,511 A * | 2/1970 | Colavecchio | H01H 37/5427 337/354 |
| 3,768,057 A * | 10/1973 | Sekira | H01H 37/54 337/354 |
| 4,201,967 A * | 5/1980 | Romerdahl | H01H 37/54 337/354 |

(Continued)

FOREIGN PATENT DOCUMENTS

| | | |
|---|---|---|
| DE | 2143652 A1 | 3/1973 |
| DE | 19708436 A1 | 9/1998 |

(Continued)

OTHER PUBLICATIONS

Search report issued by the European Patent Office for application 24159305.2 on Jul. 22, 2024.

*Primary Examiner* — Anatoly Vortman
(74) *Attorney, Agent, or Firm* — Reising Ethington P.C.

(57) ABSTRACT

A temperature-dependent switch having a temperature-dependent switching mechanism and a housing on which first and second stationary contacts are arranged. The temperature-dependent switching mechanism is configured to switch in a temperature-dependent manner between a closed state, in which the switching mechanism establishes an electrically conductive connection between the first and second stationary contacts, and an open state, in which the switching mechanism disconnects the electrically conductive connection. The switching mechanism comprises a carrier body, a spring element, a bimetallic element and a current transfer member. The current transfer member is connected to the bimetallic element by a connecting element other than the carrier body. In the closed state, the current transfer member is pressed against the first and second stationary contacts in order to establish the electrically conductive connection, and in the open state it is lifted off the first and second stationary contacts in order to disconnect the electrically conductive connection.

15 Claims, 6 Drawing Sheets

(56) References Cited

U.S. PATENT DOCUMENTS

| | | | | | |
|---|---|---|---|---|---|
| 4,551,702 | A * | 11/1985 | Hire | H01H 37/12 | 337/368 |
| 4,581,509 | A * | 4/1986 | Sanford | H01H 35/34 | 337/343 |
| 5,973,587 | A * | 10/1999 | Hofsass | H01H 37/5427 | 337/377 |
| 6,100,784 | A * | 8/2000 | Hofsass | H01H 11/0056 | 337/333 |
| 6,249,211 | B1 * | 6/2001 | Hofsaess | H01H 1/504 | 337/377 |
| 6,580,351 | B2 * | 6/2003 | Davis | H01H 37/54 | 337/333 |
| 6,836,205 | B2 * | 12/2004 | Scott | H01H 37/5427 | 337/299 |
| 10,256,061 | B2 | 4/2019 | Neumann | | |
| 10,861,662 | B2 * | 12/2020 | Hofsaess | H01H 37/52 | |
| 11,217,409 | B2 * | 1/2022 | Hofsaess | H01H 37/5409 | |
| 11,264,194 | B2 * | 3/2022 | Hofsaess | H01H 37/04 | |
| 11,476,066 | B2 * | 10/2022 | Hofsaess | H01H 37/04 | |
| 2005/0122201 | A1 * | 6/2005 | Davis | G08B 13/1681 | 337/337 |
| 2014/0168844 | A1 * | 6/2014 | Liehr | H01H 9/541 | 361/103 |

FOREIGN PATENT DOCUMENTS

| | | | | |
|---|---|---|---|---|
| DE | 102011015116 | A1 | 9/2012 | |
| DE | 102013017232 | A1 | 4/2015 | |
| EP | 2523206 | A1 * | 11/2012 | H01H 37/5427 |

* cited by examiner

TEMPERATURE-DEPENDENT SWITCH

CROSS-REFERENCE TO RELATED APPLICATIONS

This application claims priority from German patent application DE 10 2023 104 830.9, filed on Feb. 28, 2023. The entire contents of this priority application are incorporated herein by reference.

FIELD

This disclosure relates to a temperature-dependent switch.

BACKGROUND

An exemplary temperature-dependent switch known to the applicant is shown in a schematic sectional view in FIGS. 5 and 6. A further exemplary temperature-dependent switch is disclosed in DE 197 08 436 A1.

Such temperature-dependent switches are used in a principally known manner to monitor the temperature of a device. For this purpose, the switch is brought into thermal contact with the device to be protected, e.g. via one of its outer surfaces, so that the temperature of the device to be protected influences the temperature of the switching mechanism arranged inside the switch.

With the help of its external electrical terminals, the switch is connected electrically in series into the supply circuit of the device to be protected via connecting cables, so that the supply current of the device to be protected flows through the switch below a response temperature of the switch.

A temperature-dependent switching mechanism installed in the switch ensures a temperature-dependent switching behavior of the switch. This temperature-dependent switching mechanism is typically arranged between two electrodes/contacts, each of which is electrically connected to one of the two external terminals. The temperature-dependent switching behavior is configured such that it is in a closed state below the response temperature of the switch or the response temperature of the switching mechanism, in which closed state the switching mechanism establishes an electrically conductive connection between the two contacts/external terminals of the switch, and such that it changes to an open state upon exceeding the response temperature of the switching mechanism, in which open state the electrically conductive connection between the two contacts/outer terminals is disconnected or interrupted.

In this way, the temperature-dependent switching mechanism ensures that in its closed state, in which it is below the response temperature of the switch, it closes the supply circuit of the device to be protected and in its open state, in which it is above the response temperature of the switch, it interrupts the supply circuit of the device to be protected. Thus, with the help of such a temperature-dependent switch, it is possible to ensure that an electrical device is automatically de-energized by the switch in the event of unwanted overheating and thus switched off.

Such temperature-dependent switches thus offer protection against overtemperature in electrical devices of all kinds.

A temperature-dependent bimetallic element, which is configured to change its geometric shape depending on its temperature, is usually responsible in particular for the temperature-dependent switching behavior of the switching mechanism of the switch. Upon reaching and/or exceeding the response temperature of the switch, this temperature-dependent bimetallic element changes its geometric shape such that it brings the switching mechanism from its closed state to its open state.

Typically, this bimetallic element is a multi-layered, active, sheet-shaped device consisting of two, three or more interconnected components with different coefficients of thermal expansion. The connection of the individual metal or metal alloy layers in such bimetallic elements is usually material locking or positive locking and is achieved, for example, by rolling. The bimetallic element can also be configured as a trimetal element, which is why the present term "bimetallic element" also extends to the latter trimetal elements, i.e. any element having two or more interconnected metallic components with different coefficients of thermal expansion.

At low temperatures, below the response temperature of the switch, which corresponds to the response temperature of the bimetallic element, such a bimetallic element comprises a first stable geometric configuration (low temperature configuration) and at high temperatures, above the response temperature of the bimetallic element, a second stable geometric configuration (high temperature configuration). The temperature-dependent bimetallic element thus switches from its low-temperature configuration to its high-temperature configuration and vice versa in a temperature-dependent manner in the form of a hysteresis.

If the temperature of the temperature-dependent bimetallic element rises above the response temperature of the bimetallic element as a result of an increase in the temperature of the device to be protected, the bimetallic element snaps from its low-temperature configuration to its high-temperature configuration and thus brings the switching mechanism from its closed state to its open state, interrupting the current flow through the switch.

If the temperature of the switch and thus also of the temperature-dependent bimetallic element subsequently drops below a so-called reset temperature of the bimetallic element as a result of the device to be protected cooling down, the bimetallic element changes its geometric shape again from its high-temperature configuration to its low-temperature configuration, so that the switching mechanism is brought back into its closed state so that current can then flow through the switch again.

Typically, such temperature-dependent bimetallic elements are designed in such a way that their reset temperature mentioned above is lower than their response temperature. In principle, however, the temperature-dependent switching behavior can also be designed so that its reset temperature is in the same temperature range or even at exactly the same temperature as its response temperature.

In addition to the temperature-dependent bimetallic element, an additional spring element is often inserted in switching mechanisms of such temperature-dependent switches, which generates or at least helps to generate the mechanical closing pressure of the switching mechanism in the closed state. The spring element is a temperature-independent spring element, e.g. made of metal. This spring element has a relieving effect on the bimetallic element, in particular in the closed state of the switching mechanism, as the latter then has to apply less force or no force at all to generate the mechanical closing pressure in the closed state of the switching mechanism.

In the switch shown in FIGS. 5 and 6 and in the switch disclosed in DE 197 08 436 A1, the switching mechanism also comprises a current transfer member which acts as a way of contact bridge which, in the closed state, is in direct contact with both contacts of the switch in order to establish the electrically conductive connection between them. This has the advantage, in particular, that the current transfer member is the only device of the switch mechanism through which current flows in the closed state. Both the bimetallic element and the spring element can be electroless.

This has a beneficial effect on the service life of the bimetallic element and the spring element and also enables the use of such switches in electrical devices that are operated with high current levels.

The switch 100 shown in FIGS. 5 and 6 comprises a housing 110 with a cup-like lower part 112, in which a temperature-dependent switching mechanism 114 is inserted. The lower part 112 is closed by an upper part 116, which is held by the upper edge of the lower part 112. The lower part 112 can be made of metal or insulating material, while the upper part 116 is in any case made of insulating material.

Two rivets 118, 120 are arranged in the upper part 116, the inner heads of which serve as stationary contacts for the switching mechanism 114. The outer heads of the two rivets 118, 120 serve as external terminals of the switch 100, on which, for example, connection strands, connection plates or other connection lines for the electrical connection of the switch 100 can be arranged.

The switching mechanism 114 comprises a circular ring-shaped current transfer member 122 serving as a contact bridge. In the closed state of the switch 100 shown in FIG. 5, this current transfer member 122 is in contact with the two stationary contacts 118, 120, whereby the electrically conductive connection between these two stationary contacts 118, 120 is established. In contrast, in the open state of the switch 100 shown in FIG. 6, the current transfer member 122 is lifted off the two stationary contacts 118, 120, so that the electrically conductive connection between these two contacts 118, 120 is disconnected.

The temperature-dependent switching behavior of the switch 100 is essentially effected by a disc-shaped bimetallic element 124, which is coupled with the current transfer member 122 via a carrier body 126. The carrier body 126 is supported by a spring element 128 arranged in the lower part 112 of the switch 100 and is pressed upwardly in the direction of the upper part 116. In the closed state of the switch 100 shown in FIG. 5, the spring element 128 thus causes the closing pressure with which the current transfer member 122 is pressed against the two stationary contacts 118, 120. In this closed state of the switch 100, the bimetallic element 124 is mounted essentially force-free in the carrier body 126.

Upon reaching the response temperature, the bimetallic element 124 snaps from its low-temperature configuration shown in FIG. 5 to its high-temperature configuration shown in FIG. 6 and thereby opens the switch or disconnects the electrically conductive connection between the two stationary contacts 118, 120.

More precisely, the bimetallic element 124 is supported with its outer edge on the spring-mounted carrier body 126 and comes into contact with its center on an extension configured centrally on the upper part 116 and projecting from this into the interior of the switch 100, which acts as a kind of plunger 130. As a result, the bimetallic element 124 presses the carrier body 126 together with the current transfer member 122 clamped therein downwards against the force of the spring element 128, whereby the current transfer member 122 is lifted off the two stationary contacts 118, 120.

However, it has been shown that such a design of the switching mechanism 114 has various disadvantages. Firstly, the bimetallic element 124 must permanently apply a comparatively high force in the open state (FIG. 6), which exceeds the force of the spring element 128, in order to keep the switch 100 open. This can lead to risks, in particular if the bimetallic element 124 ages and the force applied by it decreases as a result. Furthermore, the configuration of the plunger 130 on the bottom side of the upper part 116 also leads to various disadvantages. On the one hand, this means that a central hole must necessarily be provided in the current transfer member 122, through which the plunger 130 protrudes. Understandably, this leads to a weakening of the material of the current transfer member 122, and thus also to a lower mass, which ultimately also results in a lower current conductivity of the current transfer member 122. On the other hand, a hard impact of the bimetallic element 124 on the plunger 130 can lead to damage to the bimetallic element 124. Furthermore, the manufacture of the upper part 116 with such a plunger 130 is also comparatively complex compared to conventional, purely plate-shaped upper parts.

SUMMARY

It is an object to provide a temperature-dependent switch that overcomes the above-mentioned disadvantages. It is particularly an object to increase the performance by increasing the switching reliability as well as the current conductivity and to improve the technical design of the switch.

According to an aspect, a temperature-dependent switch is presented that comprises a temperature-dependent switching mechanism and a housing in which the switching mechanism is arranged and on which a first stationary contact and a second stationary contact are arranged. The temperature-dependent switching mechanism is configured to switch the switch in a temperature-dependent manner between a closed state, in which the switching mechanism establishes an electrically conductive connection between the first and the second stationary contact, and an open state, in which the switching mechanism disconnects the electrically conductive connection. The switching mechanism comprises a carrier body movable in the housing, a spring element supporting the carrier body, a bimetallic element arranged in the carrier body and a current transfer member. The current transfer member is connected to the bimetallic element by a connecting element other than the carrier body. This current transfer member is pressed against the first and second stationary contacts in the closed state in order to establish the electrically conductive connection and is lifted off the first and second stationary contacts in the open state in order to disconnect the electrically conductive connection.

Similar to the switch shown in FIGS. 5 and 6, the herein presented switch thus has a carrier body which is movable in the housing and spring-mounted by the spring element, in which carrier body the bimetallic element is arranged. However, unlike the switch shown in FIGS. 5 and 6, the bimetallic element is not connected to the current transfer member via the carrier body, but via a connecting element provided separately from the latter.

This has the following advantages in particular: A plunger protruding inwards on the upper part of the switch housing is not required. Accordingly, the current transfer member does not have to be weakened by a comparatively large hole. The current transfer member can therefore be designed with a comparatively large mass. This in turn enables a higher current conductivity. The bimetallic element is no longer subject to excessive strain, as it does not strike against a plunger or other object when the switch is opened. In addition, with the configuration of the switching mechanism, the bimetallic element can be relieved in the open state of the switch, as the bimetallic element does not have to press permanently against the spring element carrying the carrier in the open state. This in turn increases the switching reliability. The structure of the housing, in particular the upper part of the housing, is also simplified compared to the switch shown in FIGS. 5 and 6 due to the elimination of the plunger.

In a refinement, the spring element is configured to exert on the carrier body a force acting in a first direction in the closed state and in the open state, respectively, and in the closed state the bimetallic element is configured to exert on the current transfer member a force acting in the first direction in order to press the current transfer member against the first and second stationary contacts, and in the open state to exert a force on the current transfer member in a second direction opposite to the first direction in order to lift the current transfer member off the first and second stationary contacts.

In the closed state of the switch, the spring element and the bimetallic element therefore exert forces in the same direction (referred to as the "first direction" in the present case). The spring element presses the carrier body, and thus also the bimetallic element arranged therein, in the first direction towards the two stationary contacts. The bimetallic element in turn presses the current transfer member towards the two stationary contacts in the first direction. The spring element and the bimetallic element thus jointly cause the closing pressure in the closed state of the switch.

In the open state, however, the force exerted by the bimetallic element on the current transfer member acts in the opposite direction to the force exerted by the spring element on the carrier body. Even in the closed state, the spring element continues to press the carrier body towards the two stationary contacts in the first direction, while the bimetallic element presses or lifts the current transfer member off the two stationary contacts.

In other words, when switching between the closed state and the open state, the bimetallic element changes the direction of the force exerted by the bimetallic element on the current transfer member. The spring element, on the other hand, exerts a force in the same direction (first direction) on the carrier body both in the closed state and in the open state.

In a further refinement, the carrier body is ring-shaped or pot-shaped. Preferably, the carrier body is rotationally symmetrical and has a central opening at least on its top side facing the two stationary contacts, in which the bimetallic element, the current transfer member and the connecting element connecting these two are arranged. In the case of the ring-shaped configuration of the carrier body, this opening is configured as a through opening.

It should be noted that "ring-shaped" in the present case does not necessarily imply circular ring-shaped. Instead, it refers to any type of body of revolution whose cross-section can be of any shape.

Such a ring- or pot-shaped carrier body can be arranged inside the switch housing in an extremely space-saving manner without having to increase the overall dimensions of the switch. The ring or pot-shaped carrier body also increases the mechanical and electrical shielding of the other components of the switch mechanism.

The carrier body is preferably made of an electrically insulating material.

This has the advantage that the bimetallic element is thus electrically insulated from the spring element. As a result, neither the bimetallic element nor the spring element is energized when the switch is in the closed state. In addition, the carrier body can be configured with a comparatively low mass, which in turn has a positive effect on the service life of the spring element carrying the carrier body.

If, on the other hand, a higher rigidity and mass of the carrier body is desired, it can also be made of an electrically conductive material, e.g. metal.

It is also preferred that the carrier body at least partially surrounds a circumferential edge of the bimetallic element. It is particularly preferred that the carrier body completely surrounds the circumferential edge of the bimetallic element.

The carrier body thus provides additional protection for the bimetallic element inside the switch housing.

It is further preferred that the carrier body also at least partially surrounds a circumferential edge of the current transfer member, but without touching the current transfer member or its circumferential edge.

Unlike the switch shown in FIGS. 5 and 6, the current transfer member is therefore not clamped in the carrier body or firmly connected to it. Instead, the circumferential edge of the current transfer member is spaced apart from the carrier body. Accordingly, the current transfer member can also move relative to the carrier body, which increases its freedom of movement.

For example, it is preferred that the current transfer member moves relative to the carrier body when the temperature-dependent switching mechanism switches the switch between the closed state and the open state. Thereby, it is preferred in particular that the current transfer member and the carrier body move in opposite directions to each other when switching from the closed state to the open state or from the open state to the closed state. This leads to advantageous kinematics when switching between the closed state and the open state or between the open state and the closed state.

In a further refinement, the spring element presses the carrier body against an inner side of the housing in the open state. In the open state, the carrier body rests against the an inner side of the housing with one of its sides opposite the side of the carrier body on which the spring element engages with the carrier body.

The carrier body is therefore supported on the inner side of the housing. This limits the spring travel of the spring element. This also has the advantage that the force exerted by the spring element is dissipated into the housing in the open state of the switching mechanism. Unlike the switch shown in FIGS. 5 and 6, the bimetallic element does not have to work against the force of the spring element in the open state in order to lift the current transfer member off the two stationary contacts. This can have a very positive effect on the switching reliability of the presented switch.

In the closed state, however, the carrier body is preferably spaced apart from the inner side of the housing.

This has the advantage that the force exerted by the spring element on the carrier body causes the closing pressure with the force exerted by the bimetallic element. The spring element and the bimetallic element are connected mechanically in series in the closed state.

In a further refinement, the bimetallic element is configured as a bimetallic disc which, in the closed state, is supported with its circumferential edge against a first section of the carrier body in order to press the current transfer member against the first and second stationary contacts, and which, in the open state, is supported with its circumferential edge against a second section of the carrier body, which is spaced apart from the first section, in order to lift the current transfer member off the first and second stationary contacts.

The bimetallic element is therefore supported with its circumferential edge on the carrier body both in the closed state and in the open state of the switching mechanism. The bimetallic element can, for example, have a circular disc shape. The support on the carrier body in the closed state as well as in the open state in turn ensures advantageous kinematics of the switching mechanism when switching between the aforementioned switching mechanism states.

Preferably, the first and second sections, on which the bimetallic disc is supported with its circumferential edge, are arranged opposite each other and on opposite sides of the bimetallic disc.

The bimetallic disc can thus be designed in the conventional way, such that it snaps from a convex or concave low-temperature configuration into a correspondingly inverted concave or convex high-temperature configuration when its response temperature is reached.

The second section on which the bimetallic disc is supported in the open state of the switching mechanism can, for example, be formed by a radially inwardly projecting part of the carrier body, which reduces the inner diameter of the carrier body in sections. This part of the carrier body can, for example, be configured by a grain, a bead or a radially inwardly projecting nose.

In a further refinement, the carrier body is composed of several parts and comprises a first carrier part body and a second carrier part body loosely arranged on the first carrier part body, wherein the first section is arranged on the first carrier part body and the second section is arranged on the second carrier part body.

This refinement has the advantage that the two sections on which the bimetallic disc is supported with its outer circumferential edge are easier to manufacture. This also makes it easier to manufacture the carrier body as such. Both carrier part bodies are preferably ring-shaped. The two carrier part bodies can also preferably be plugged into each other.

The two-part configuration of the carrier body also has kinematic advantages, as the spring element acts on the first carrier part body in the open state, while the bimetallic disc acts on the second carrier part body.

In a further refinement, the connecting element, by means of which the bimetallic element is fixed to the current transfer member, comprises a rivet. This rivet is preferably passed through an opening arranged centrally in the bimetallic element and the current transfer member. The rivet ensures a captive connection between the current transfer member and the bimetallic element, wherein the bimetallic element is held on the rivet in a captive manner, but with play. This guarantees sufficient mobility of the bimetallic element, which is required in particular when switching between the closed state and the open state of the switching mechanism.

In a further refinement, the housing comprises a lower part and an upper part held on the lower part, wherein the first and second stationary contacts are arranged on the upper part and the spring element is clamped between the lower part and the carrier body.

It is understood that with the formulation that the upper part is held on the lower part, both an active and a passive holding is meant. In other words, it can mean both that the upper part is held by the lower part and that the lower part is held by the upper part. The important thing is that the two parts of the housing are held together.

Preferably, both the lower part and the upper part are made of electrically insulating material. For example, the lower part and the upper part can be made of plastic. However, it is particularly preferable for the lower part and/or the upper part to be made of ceramic.

In particular, it is advantageous if the upper part, on which the two stationary contacts are arranged, is made of ceramic. Ceramic has the advantage of a much higher melting point than plastic. This significantly minimizes the risk of outgassing compared to a plastic cover. In addition, there is an improved seal in the area of the two stationary contacts with a ceramic upper part. With plastic tops, on the other hand, it can happen that solder flows into the interior of the switch due to capillary action when the external connections are attached or soldered to the stationary contacts arranged on the top.

It is understood that the features mentioned above and the features to be explained below can be used not only in the combination indicated in each case, but also in other combinations or on their own, without departing from the spirit and scope of the present disclosure.

DESCRIPTION OF PREFERRED EMBODIMENTS

Figure 1:
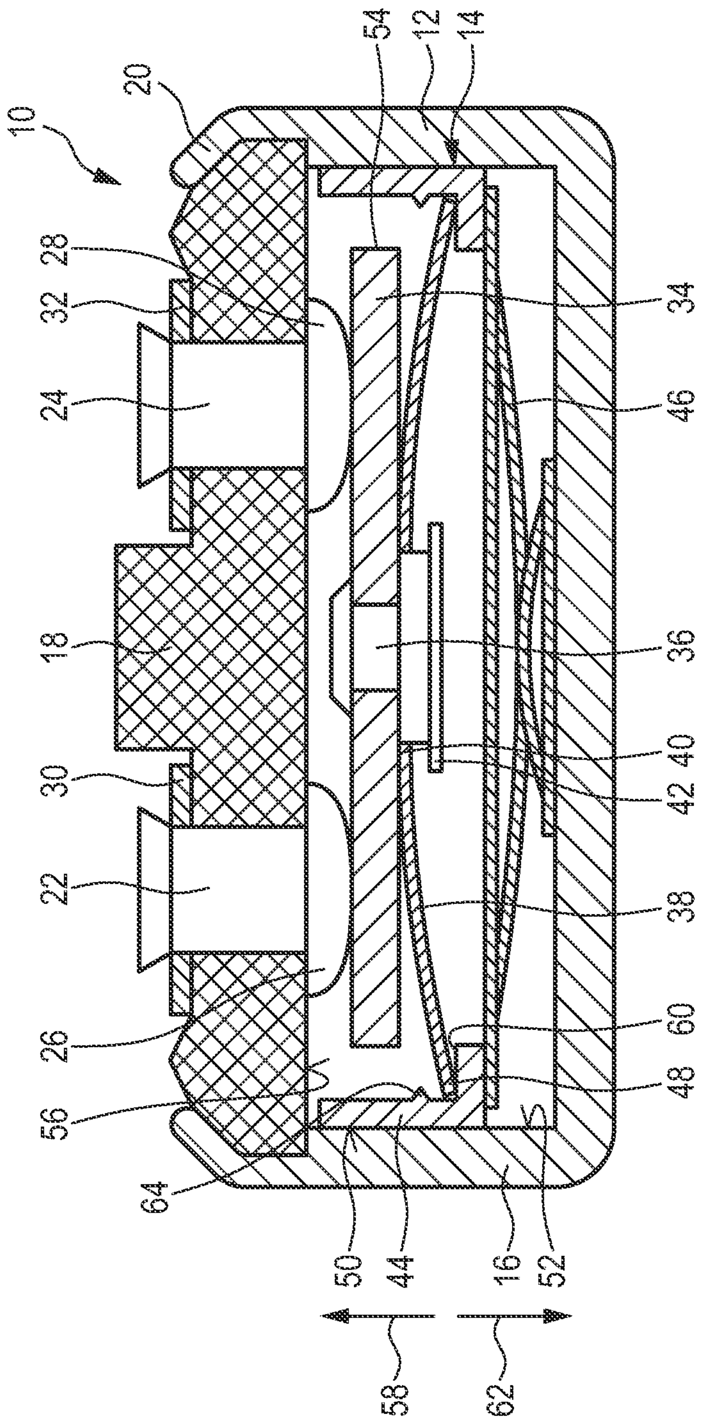
FIG. 1 a schematic sectional view of a first embodiment of the switch, wherein the temperature-dependent switching mechanism of the switch is in its closed state.
Figure 2:
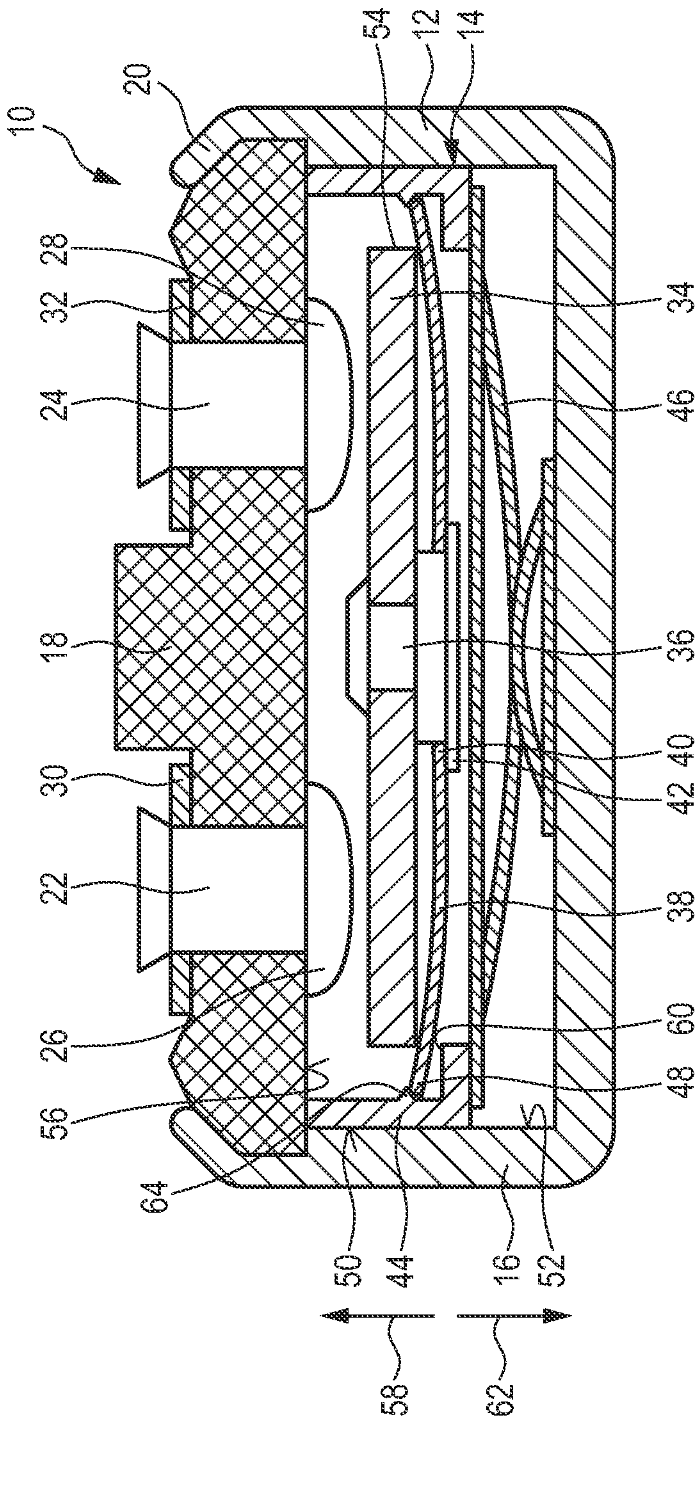
FIG. 2 a schematic sectional view of the embodiment of the switch shown in FIG. 1, wherein the temperature-dependent switching mechanism of the switch is in its open state.
Figure 3:
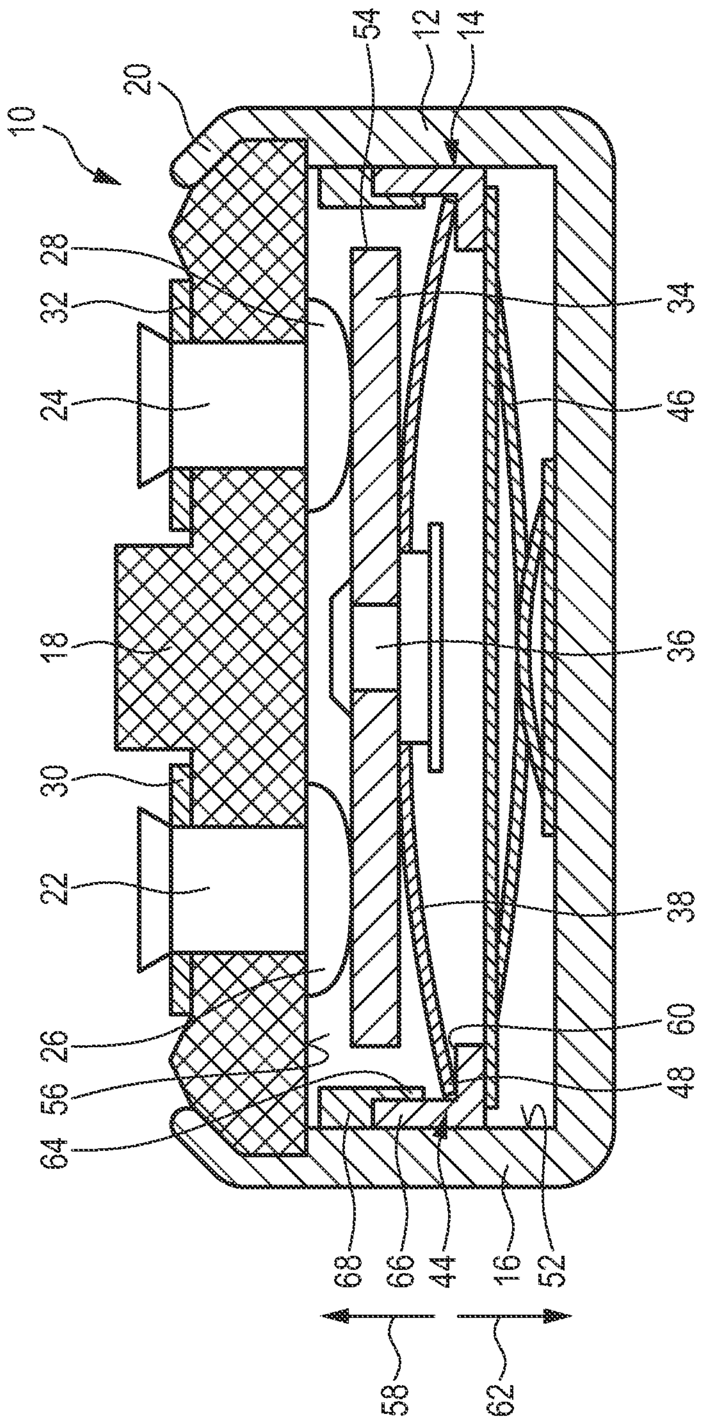
FIG. 3 a schematic sectional view of a second embodiment of the switch, wherein the temperature-dependent switching mechanism of the switch is in its closed state.
Figure 4:
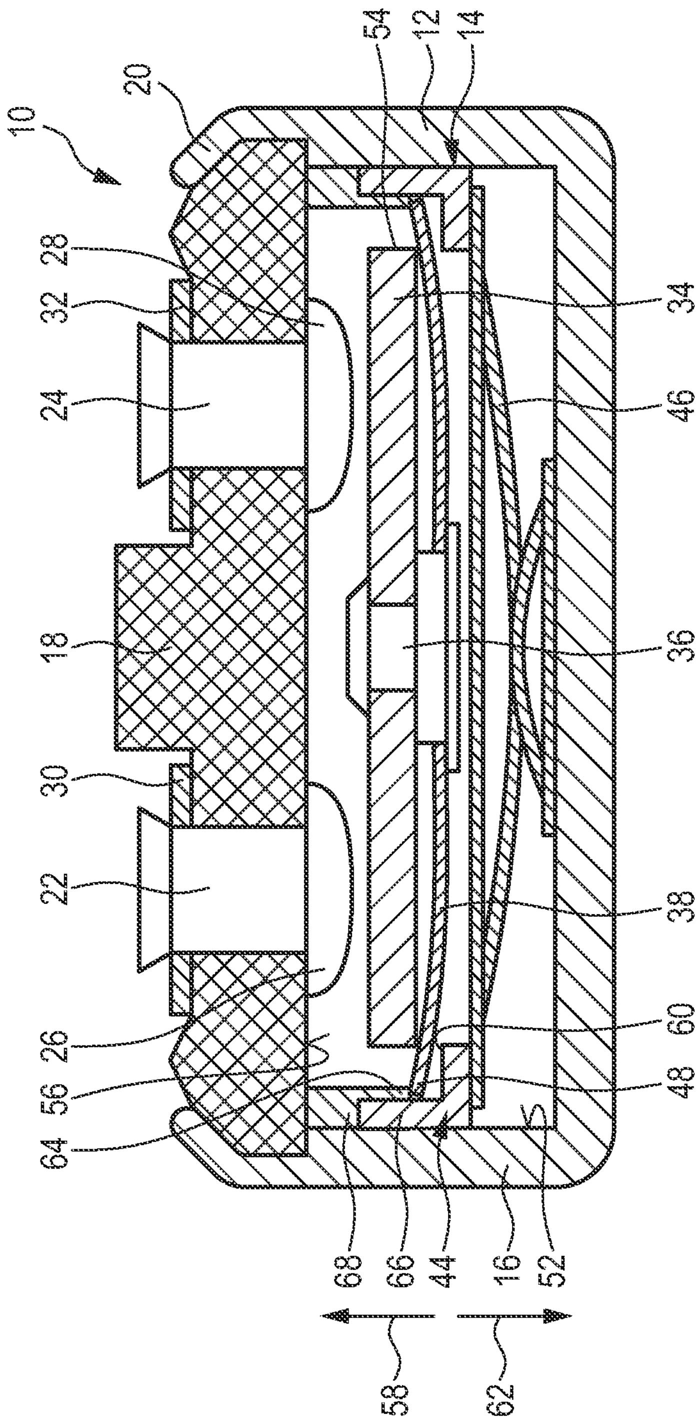
FIG. 4 a schematic sectional view of the embodiment of the switch shown in FIG. 3, wherein the temperature-dependent switching mechanism of the switch is in its open state.
Figure 5:
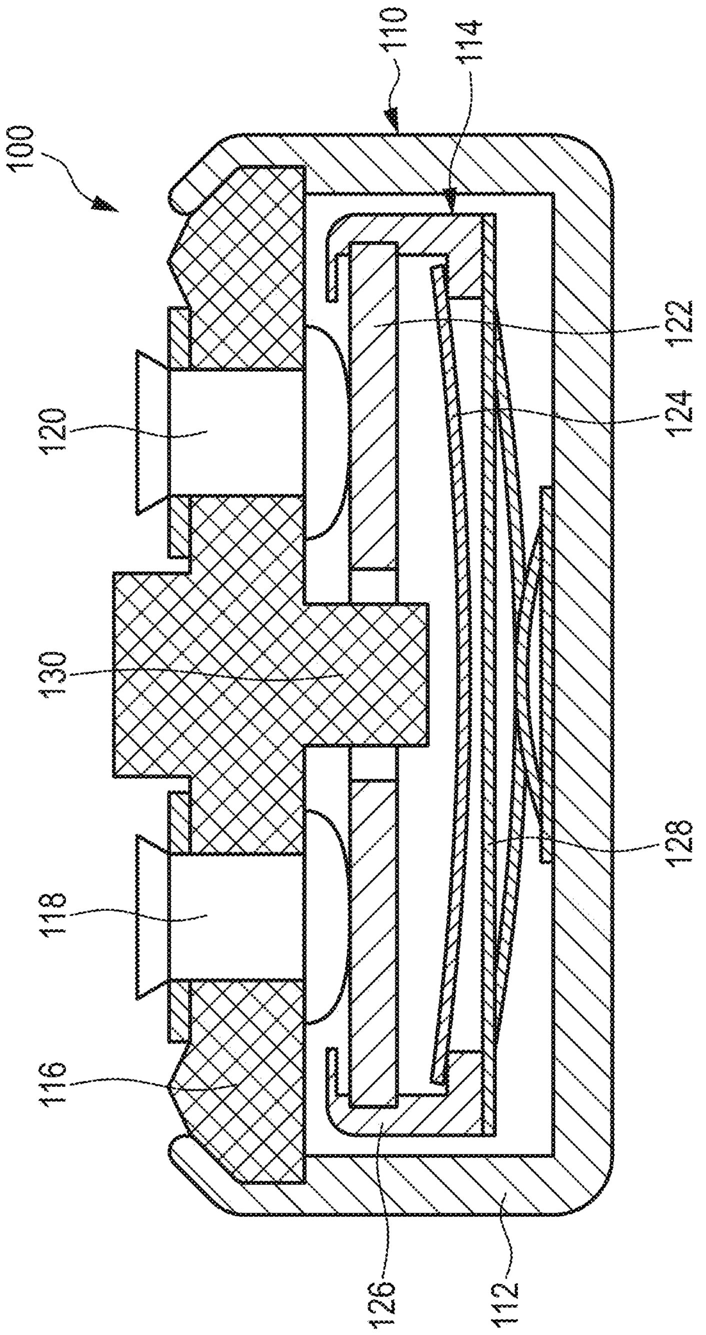
Fig. 5 (Prior Art)
FIG. 5 a schematic sectional view of a switch according to the prior art, wherein the temperature-dependent switching mechanism of the switch is in its closed state.
Figure 6:
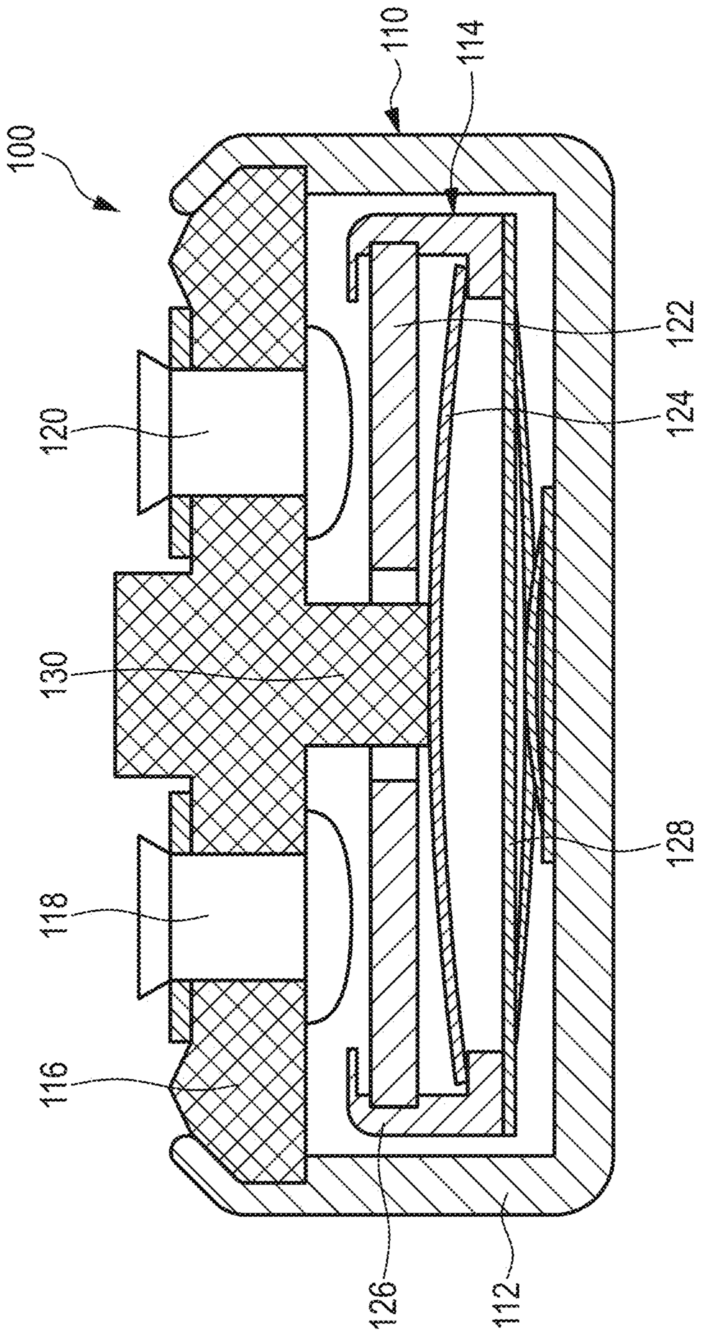
Fig. 6 (Prior Art)
FIG. 6 a schematic sectional view of the switch shown in FIG. 5, wherein the temperature-dependent switching mechanism of the switch is in its open state.

FIGS. 1-4 show two embodiments of the temperature-dependent switch, wherein FIGS. 1 and 3 each show the closed state of the switch and FIGS. 2 and 4 each show the open state of the switch. In each case, the switch is marked in its entirety with the reference number 10.

The switch 10 comprises a housing 12 in which a temperature-dependent switching mechanism 14 is arranged.

The housing 12 comprises a substantially pot-shaped lower part 16, into which the switching mechanism 14 is inserted. The lower part 16 is closed by an upper part 18, which is held at the lower part 16 by the raised edge 20 of the latter.

While the lower part 16 can be made of any material, the upper part 18 is made of insulating material. Preferably, the upper part 18 is made of ceramic in order to comprise the greatest possible heat resistance and to have a lower risk of outgassing compared to plastic.

Two rivets 22, 24 are arranged in the upper part 18, the inner heads of which serve as stationary contacts 26, 28 for the switching mechanism 14. The rivets 22, 24 function as piercing contacts which penetrate the upper part 18 and to the top sides of which the electrical external terminals 30, 32 can be connected. For example, the external terminals 30, 32 are soldered in the form of stranded wires, connection plates or other electrical connection lines to the sections of the rivets 22, 24 that protrude upwardly from the upper part 18.

The two stationary contacts 26, 28 are assigned a current transfer member 34, which is configured as a circular disc-shaped contact bridge. The current transfer member 34 is coupled with a bimetallic element 38, which is also in the form of a circular disc, by means of a connecting element 36. The connecting element 36 is designed as a rivet, which is passed through a hole provided centrally in the current transfer member 34 and is preferably firmly connected to the current transfer member 34.

The bimetallic element 38 is held on the rivet 36 in a captive manner, but with play. The rivet 36 is passed through a hole provided centrally in the bimetallic element 38, wherein the bimetallic element 38 is held captive but with play with its inner edge 40 between the current transfer member 34 and a support shoulder 42 of enlarged diameter formed on the bottom side of the rivet 36.

In addition to the current transfer member 34, the connecting element 36 and the bimetallic element 38, the switching mechanism 14 further comprises a carrier body 44 and a spring element 46 supporting the carrier body 44. The carrier body 44 serves in particular as a support for the part of the switching mechanism 14 comprising the current transfer member 34, the connecting element 36 and the bimetallic element 38. The carrier body 44 can either be detachably mounted on the spring element 46 or fixed to the spring element 46 in a material-locking manner.

The carrier body 44 is designed as a substantially ring-shaped body of revolution which surrounds the circumferential, outer edge 48 of the bimetallic element 38. The circumferential side 50 of the carrier body 44 can rest against the inner circumferential side 52 and be guided on the latter in a sliding manner. Depending on the embodiment, however, it is also possible that the circumferential side 50 of the carrier body 44 is arranged at a distance from the inner circumferential side 52, so that the carrier body 44 then accordingly has no contact with the lower part 16 of the housing 12.

Unlike the bimetallic element 38, the current transfer member 34 has no direct contact with the carrier body 44. The circumferential edge 54 of the current transfer member 34 is spaced from the inner wall of the carrier body 44. Accordingly, the current transfer member 34 is movable relative to the carrier body 44 without collision.

The carrier body 44 is movably stored within the housing 12. In the closed state of the switching mechanism 14 shown in FIG. 1, the spring element 46 presses upwardly in the direction of an inner side 56 of the upper part 18 of the housing 12. As can be seen from FIG. 1, however, the carrier body 44 is spaced apart from this inner side 56 of the upper part 18 of the housing in the closed state of the switching mechanism 14. At the same time, the bimetallic element 38 is supported with its circumferential edge 48 against the carrier body 44 and presses, with its inner edge 40, the current transfer member 34 upwardly against the two stationary contacts 26, 28. More precisely, the bimetallic element 38 is supported with its circumferential edge 48 against a first section 60 of the carrier body 44.

In the closed state of the switching mechanism 14, the spring element 46 and the bimetallic element 38 thus jointly exert the contact pressure with which the current transfer member 34 is pressed against the two stationary contacts 26, 28. The spring element 46 and the bimetallic element 38 are connected mechanically in series in the closed state shown in FIG. 1. The force exerted by the spring element 46 on the carrier body 44 acts in the same direction 58 (upwardly) as the force exerted by the bimetallic element 38 on the current transfer member 34. This direction, indicated with an arrow 58, is referred to as the "first direction" in the present case.

If, starting from the situation shown in FIG. 1, in which the switching mechanism 14 is in its closed state and establishes the electrically conductive connection between the two contacts 26, 28 via the current transfer member 34, the temperature of the bimetallic element 38 rises above the response temperature, the bimetallic element 38 snaps from its convex high-temperature configuration shown in FIG. 1 to its concave low-temperature configuration shown in FIG. 2. Thereby, the bimetallic element 38 presses the connecting element 36 configured as a rivet and the current transfer member 34 firmly connected thereto downwards in the direction of the arrow 62, thereby lifting the current transfer member 34 off the contacts 26, 28 and interrupting the electrically conductive connection between the two contacts 26, 28.

The bimetallic element 38 thereby exerts a force on the connecting element 36 and the current transfer member 34, which force acts in a second direction 62 opposite to the first direction 58. With its circumferential outer edge 48, the bimetallic element 38 is supported for this purpose on a second section 64 of the carrier body 44. This second section 64 is arranged on an opposite side of the bimetallic element 38 compared to the first section 60. In the embodiment shown in FIGS. 1 and 2, the second section 64 is configured by a bead or a radially inwardly projecting, circumferential nose, which causes a cross-sectional narrowing of the inner diameter of the carrier body 44 and serves as a counter-holder for the bimetallic element 38 in the open state of the switching mechanism 14.

In the open state of the switching mechanism 14 shown in FIG. 2, the bimetallic element 38 exerts a force on the connecting element 36 and thus also indirectly on the current transfer member 34 in the second direction 62, while the spring element 46 continues to exert a force on the carrier body 44 which acts in the opposite first direction 58. As a result, although the current transfer member 34 is pulled downwardly by the contacts 26, 28 due to the high temperature configuration of the bimetallic element 38, the carrier body 44 is pushed upwardly until it rests with its top side against the inside or bottom side 56 of the upper housing part 18. Thus, in the open state of the switching mechanism 14 shown in FIG. 2, the carrier body 44 is clamped between the spring element 46 and the upper part 18 of the housing 12. The force exerted by the spring element 46 on the carrier body 44 thus does not reduce the force exerted by the bimetallic element 38 on the connecting element 36.

The carrier body 44 thus moves upwardly along the first direction 58 during the switching process, in which the switching mechanism 14 is moved from the closed state shown in FIG. 1 to the open state shown in FIG. 2 due to the temperature, while the current transfer member 34 simultaneously moves downwardly in the opposite direction 62. Switching from the closed state to the open state thus leads to a partial relief or expansion of the spring element 46.

FIGS. 3 and 4 show a second embodiment of the switch 10, which differs essentially by the embodiment of the carrier body 44. The other devices of the switch housing 12 and the switching mechanism 14 do not differ from the first embodiment shown in FIGS. 1 and 2 and are therefore not explained again.

FIG. 3 shows the closed state of switch 10. FIG. 4 shows the open state of switch 10.

In the second embodiment of the switch 10 shown in FIGS. 3 and 4, the carrier body 44 is composed of two parts. The carrier body 44 comprises a first carrier part body 66 and a second carrier part body 68. Both carrier part bodies 66, 68 are loosely connected to each other.

Both carrier part bodies 66, 68 are designed as ring-shaped bodies. The second carrier part body 68 is placed on or attached to the first carrier part body 66. The first carrier part body 66 is essentially L-shaped in cross-section. The cross-section of the second carrier part body 68 is essentially inverted L-shaped.

In the closed state shown in FIG. 3, the bimetallic element 38 is supported with its circumferential outer edge 48 on the first section 60 provided on the first support member 66. The second section 64 of the carrier body 44, on which the circumferential edge 48 of the bimetallic element 38 is supported in the closed state shown in FIG. 4, is arranged on the second carrier body 68 according to the second embodiment. Thus, the bimetallic element 38 is supported on the first carrier part body 66 in the closed state shown in FIG. 3 and on the second carrier part body 68 in the open state shown in FIG. 4.

Similar to the switch 10 according to the first embodiment, the carrier body 44 or the second carrier part body 68 is spaced apart from the inner side 56 of the upper housing part 18 in the closed state of the switching mechanism 14 and rests against this inner side 56 in the open state of the switching mechanism 14. On the one hand, the two-part configuration of the carrier body 44 has the advantage that the second section 64, which serves as a counterholder for the bimetallic element 38 in the open state of the switching mechanism 14, can be produced more easily. On the other hand, the two-part configuration of the carrier body 44 also has kinematic advantages, since the bimetallic element 38 and the spring element 46 then act on different part bodies 66, 68 of the carrier body 44 in the open state of the switching mechanism 14.

It is understood that various further modifications can be made to the switch 10 without leaving the spirit and scope of the present disclosure. For example, the housing 12 can have a different shape or a multi-part structure. The bimetallic element 38, the spring element 46, the connecting element 36 and the current transfer member 34 can also have a different shape and design than that shown in FIGS. 1-4 present.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A temperature-dependent switch, comprising: a temperature-dependent switching mechanism and a housing in which the temperature-dependent switching mechanism is arranged, wherein the housing comprises a first stationary contact and a second stationary contact, wherein the temperature-dependent switching mechanism is configured to switch in a temperature-dependent manner between a closed state, in which the switching mechanism establishes an electrically conductive connection between the first stationary contact and the second stationary contact, and an open state, in which the switching mechanism disconnects the electrically conductive connection, wherein the switching mechanism comprises a carrier body movable in the housing, a spring element supporting the carrier body, a bimetallic element arranged in the carrier body and a current transfer member that is connected to the bimetallic element by a connecting element other than the carrier body, wherein, in the closed state, the current transfer member is pressed against the first stationary contact and the second stationary contact in order to establish the electrically conductive connection, and wherein, in the open state, the current transfer member is lifted off the first stationary contact and the second stationary contact in order to disconnect the electrically conductive connection.

2. The temperature-dependent switch according to claim 1, wherein, in the closed state and in the open state, the spring element exerts on the carrier body a first force acting in a first direction, wherein, in the closed state, the bimetallic element exerts on the current transfer member a second force acting in the first direction in order to press the current transfer member against the first stationary contact and the second stationary contact, and wherein, in the open state, the bimetallic element exerts on the current transfer member a third force acting in a second direction opposite to the first direction in order to lift the current transfer member off the first stationary contact and the second stationary contact.

3. The temperature-dependent switch according to claim 1, wherein the carrier body is ring-shaped or pot-shaped.

4. The temperature-dependent switch according to claim 1, wherein the carrier body comprises an electrically insulating material.

5. The temperature-dependent switch according to claim 1, wherein the carrier body at least partially surrounds a circumferential edge of the bimetallic element.

6. The temperature-dependent switch according to claim 1, wherein the carrier body at least partially surrounds a circumferential edge of the current transfer member without contacting it.

7. The temperature-dependent switch according to claim 1, wherein the current transfer member moves relative to the carrier body when the temperature-dependent switching mechanism switches between the closed state and the open state.

8. The temperature-dependent switch according to claim 1, wherein, in the open state, the spring element presses the carrier body against an inner side of the housing.

9. The temperature-dependent switch according to claim 8, wherein, in the closed state, the carrier body is spaced apart from the inner side of the housing.

10. The temperature-dependent switch according to claim 1, wherein, in the closed state, a circumferential edge of the bimetallic element is supported against a first section of the carrier body in order to press the current transfer member against the first stationary contact and the second stationary contact, and wherein, in the open state, the circumferential edge of the bimetallic element is supported against a second section of the carrier body, which is spaced apart from the first section, in order to lift the current transfer member off the first stationary contact and the second stationary contact.

11. The temperature-dependent switch according to claim 10, wherein the first section and the second section are arranged opposite to each other and on opposite sides of the bimetallic element.

12. The temperature-dependent switch according to claim 10, wherein the carrier body comprises a first carrier part body and a second carrier part body loosely arranged on the first carrier part body, wherein the first section is arranged on the first carrier part body and the second section is arranged on the second carrier part body.

13. The temperature-dependent switch according to claim 1, wherein the connecting element comprises a rivet.

14. The temperature-dependent switch according to claim 1, wherein the housing comprises a lower part and an upper part held on the lower part, wherein the first stationary contact and the second stationary contact are arranged on the upper part, and wherein the spring element is clamped between the lower part and the carrier body.

15. The temperature-dependent switch according to claim 14, wherein the lower part and the upper part comprises an electrically insulating material.

* * * * *